(12) United States Patent
Boulter et al.

(10) Patent No.: US 6,293,048 B1
(45) Date of Patent: Sep. 25, 2001

(54) HYDROPONIC FEEDER AND COOLER

(76) Inventors: Clay Boulter, 832 West 1$^{st}$ Street, North Vancouver, British Columbia (CA), V7P 1A1; John Fagerlund, 3247 Royal Avenue, North Vancouver, British Columbia (CA), V7K 1Y7

( * ) Notice: Subject to any disclaimer, the term of this patent is extended or adjusted under 35 U.S.C. 154(b) by 0 days.

(21) Appl. No.: 09/326,563

(22) Filed: Jun. 7, 1999

(51) Int. Cl.$^7$ .................................................... A01G 31/00
(52) U.S. Cl. ........................ 47/62 E; 47/62 N; 47/62 R
(58) Field of Search ..................... 47/59, 62 R, 62 A, 47/62 C, 62 E; 62/64, 78, 373, 376, 304

(56) References Cited

U.S. PATENT DOCUMENTS

| | | | | |
|---|---|---|---|---|
| 77,624 | * | 5/1868 | Koch | 62/371 |
| 2,104,684 | * | 1/1938 | Wilson, Jr. | |
| 3,696,630 | * | 10/1972 | Bressickello | 62/374 X |
| 3,714,793 | * | 2/1973 | Eigenbrod | 62/64 X |
| 3,890,740 | * | 6/1975 | Miller | 47/1.01 R |
| 4,107,937 | * | 8/1978 | Chmiel | 62/64 |
| 4,159,595 | | 7/1979 | Dalle et al. | 47/2 |
| 4,527,353 | | 7/1985 | Newby | 47/59 |
| 4,577,435 | * | 3/1986 | Springer et al. | 47/2 |
| 4,780,989 | | 11/1988 | Mears et al. | 47/65 |
| 4,860,490 | * | 8/1989 | Morris et al. | 47/63 |
| 4,992,942 | | 2/1991 | Bauerle et al. | 366/420 |
| 5,146,709 | * | 9/1992 | Iseki | 47/41.01 |
| 5,488,801 | * | 2/1996 | Nix | 47/60 |
| 5,634,294 | | 6/1997 | Rohosa | 47/58 |
| 5,813,168 | | 9/1998 | Clendening | 47/17 |

FOREIGN PATENT DOCUMENTS

| | | |
|---|---|---|
| 9187730 | 8/1991 | (AU) . |
| 500484 | 4/1992 | (EP) . |
| 02053424 A | * 2/1990 | (JP) . |
| 404187034 A | * 7/1992 | (JP) . |
| 04356144 A | * 12/1992 | (JP) . |

* cited by examiner

Primary Examiner—Charles T. Jordan
Assistant Examiner—Son T. Nguyen
(74) Attorney, Agent, or Firm—Norman M. Cameron

(57) ABSTRACT

An apparatus and method for supplying an aqueous liquid for plants utilizes a reservoir having inside walls. There is a conduit for discharging the liquid so the liquid flows along walls of the reservoir. There is a cooler for cooling the walls so the liquid flowing along the walls is thereby cooled. For example, the reservoir may comprise a converted chest-type freezer unit. There may be an opening in the walls of the reservoir and the fan located in the opening to direct air into the reservoir and aerate liquid therein.

18 Claims, 4 Drawing Sheets

HYDROPONIC FEEDER AND COOLER

BACKGROUND OF THE INVENTION

This invention relates to apparatuses and methods for feeding and watering plants and, in particular, to apparatuses and methods for feeding, cooling and providing an aerated solution to the roots of plants grown hydroponically.

The growing of plants hydroponically involves supplying an aqueous solution to the roots of the plants, for example by spraying solution onto the roots or by suspending the roots in a medium saturated with the solution. The solution is principally water with fertilizers and other nutrients added. Optimal growth, or even survival of the plants, requires that the roots be provided with an air enriched solution and kept within a specified temperature range. Typically this is a lower temperature range than required for the portion of the plant above the roots. This parallels the situation in nature where the roots of the plant are in the cooler ground, whereas the upper portions of the plant are in the air which is usually warmer than the ground when the plant is growing.

Thus hydroponic growing operations typically include a cooler to cool the aqueous solution before it is fed to the roots of the plant. This cooler is usually separate from the reservoir used to store the solution. In addition, the solution should be aerated to optimize plant growth. Again a separate aerator is normally required. All of this equipment can be complex to set up and relatively expensive to install.

U.S. Pat. No. 4,159,595 to Dalle shows a tank used to hold a quantity of liquid and which is equipped with a float to maintain a constant level. The liquid is subsequently heated, or alternatively cooled, while flowing along a hose.

U.S. Pat. No. 5,813,168 to Glendening discloses an environmentally controlled green house. There are hydroponic plant beds disposed on top of the exchangers.

Australian Patent Number 9187730 discloses a method of growing plants by hydroponics where the root system is kept relatively cool.

U.S. Pat. No. 5,634,294 to Rohosa discloses a method of growing plants where a blower is connected to a network of pipes and continuously injects air under pressure.

U.S. Pat. No. 4,577,435 to Springer discloses a microclimate temperature control apparatus for heating and/or cooling of plants. The cooling is accomplished by tubes.

Other patents relating to thermal control of hydroponic systems include European Patent Number 500484 and U.S. Pat. No. 4,780,989. The latter shows a nutrient tank. Water is heated in the tank. The European patent shows a tank with a float.

U.S. Pat. No. 4,527,353 shows another distribution system for nutrients including a tank and a float to maintain the level of liquid.

An aerated leachate tank is disclosed in U.S. Pat. No. 4,992,942.

The prior art however does not reveal a simple, economical unit which can function simultaneously to store the aqueous solution, cool it and aerate it.

Accordingly, it is an object of the invention to provide an improved economical, reliable unit capable of conditioning aqueous solutions for the roots of plants, whether grown hydroponically or in soil.

It is also an object of the invention to provide an improved unit which can simultaneously store and cool such aqueous solutions.

It is a further object of the invention to provide an improved unit which inhibits algae growth by using an opaque container.

It is a further object of the invention to provide an improved unit which can also aerate the solution without requiring a separate piece of equipment.

SUMMARY OF THE INVENTION

There is provided, according to one aspect of the invention, an apparatus for supplying an aqueous liquid for plants. The apparatus includes a reservoir having inside walls. There is a conduit for discharging the liquid so the liquid flows along the walls of the reservoir. There is a cooler for cooling the walls so the liquid flowing along the walls is thereby cooled.

Preferably there is an opening in the walls of the reservoir and a fan located in the opening to direct air into the reservoir and thereby aerate the liquid.

The apparatus of one preferred embodiment has a top, the conduit being near the top of the reservoir and the reservoir having a pool of liquid below the conduit, whereby the liquid flows over the walls and flows downwardly to the pool of liquid. The walls are cooled, thereby cooling the liquid.

There is provided, according to another aspect of the invention, a method for treating an aqueous liquid for plants. This method includes the steps of providing a reservoir for the liquid and providing a pool of the aqueous liquid in the reservoir. The reservoir is cooled, thereby cooling the aqueous liquid.

Preferably the method includes the step of regulating the depth of the pool of liquid, the reservoir having walls extending above the pool of liquid, the liquid being directed along the walls and flowing downwardly into the pool. The walls are cooled, thereby cooling the liquid.

Air may be forced into the reservoir above the pool of liquid to aerate the liquid.

DETAILED DESCRIPTION OF THE PREFERRED EMBODIMENTS

Figure 1:
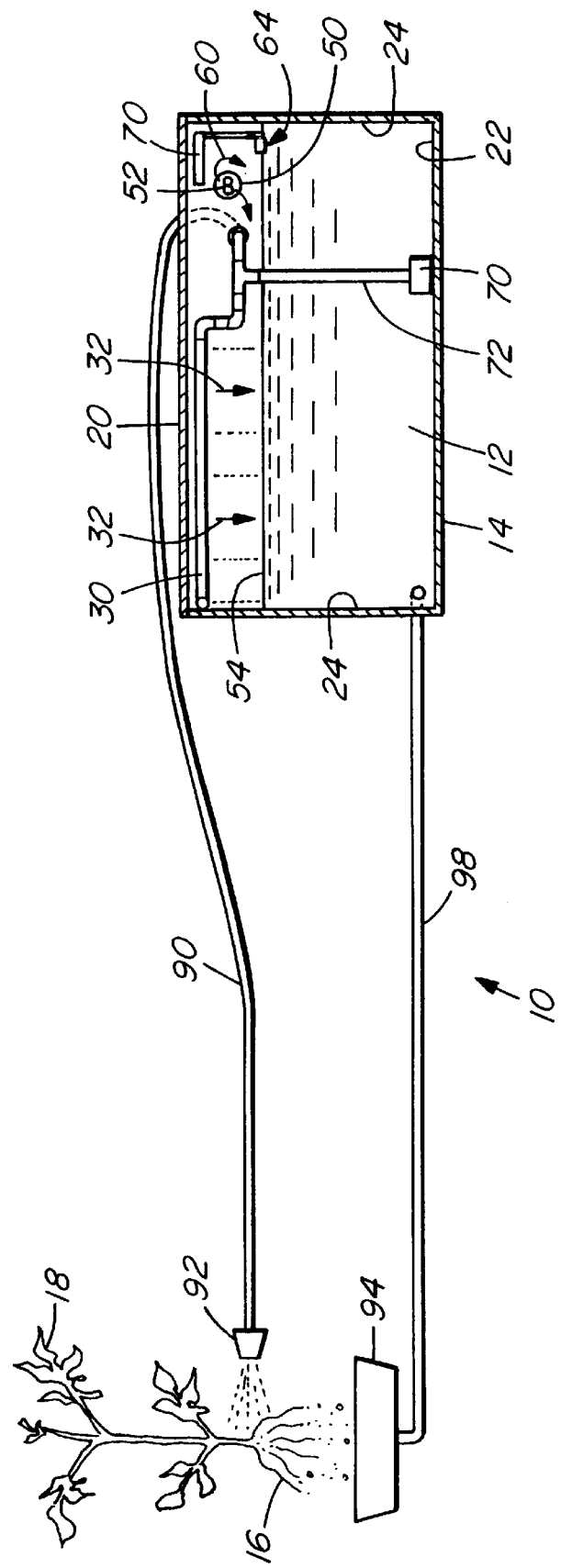
FIG. 1 is a side, partly diagrammatic view, of an apparatus for supplying an aqueous liquid for plants, according to an embodiment of the invention.

Referring first to FIG. 1, this shows an apparatus 10 for supplying an aqueous liquid 12 contained in a reservoir 14 to roots 16 of a plant 18. The reservoir has a top 20, a bottom 22 and inside, side walls 24. There is a conduit, in this case a spray bar 30, near the top of the reservoir, for discharging liquid so the liquid flows along the inside walls of the reservoir as indicated by arrows 32. The walls are generally vertical in this example and there are four walls forming the front 80, back 82 and sides 84 and 86 of the unit as labeled in FIG. 3.

Figure 2:
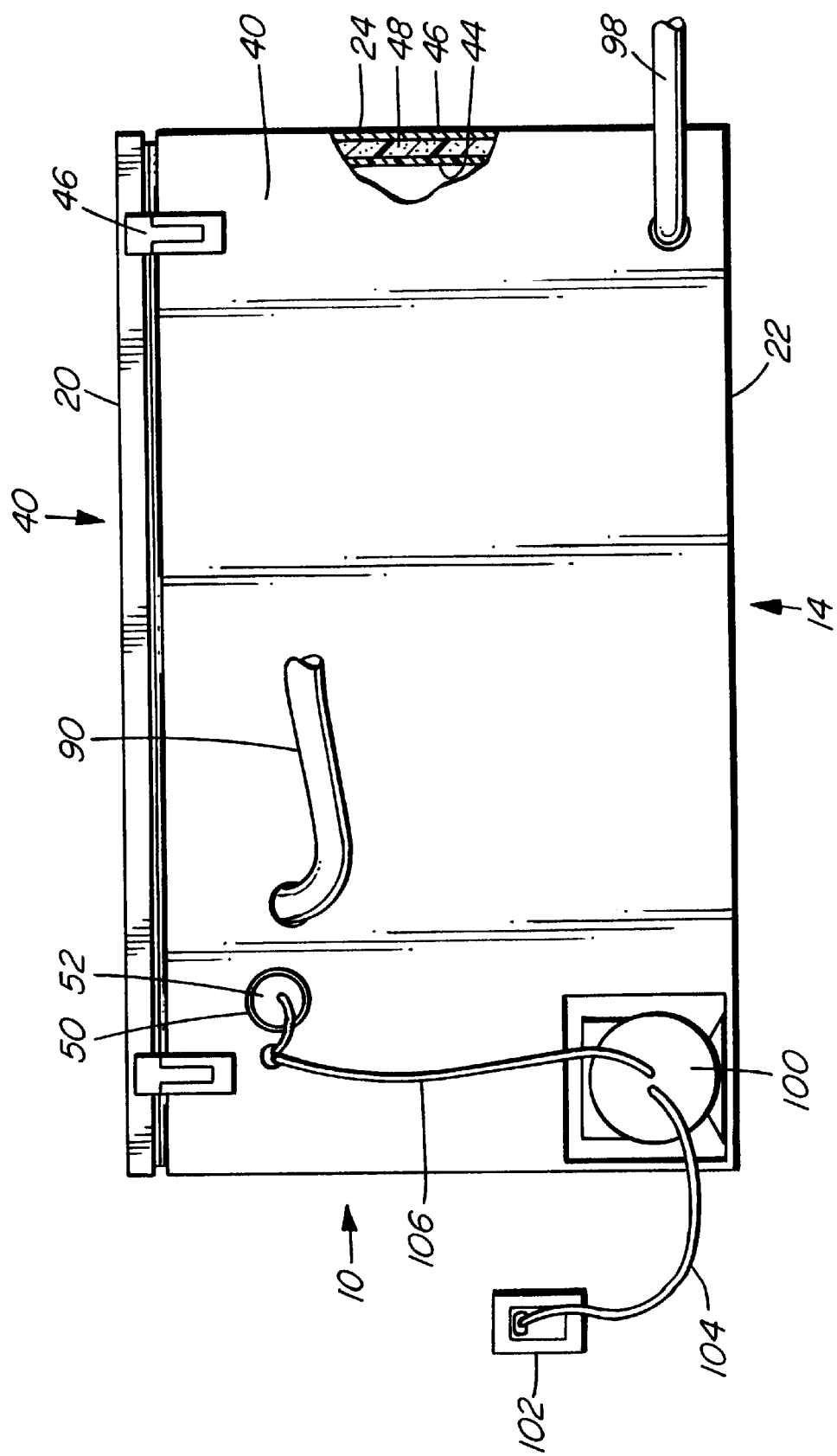
FIG. 2 is a side view, partly broken away, of the reservoir unit thereof.

In this particular example the reservoir comprises a modified, chest-type freezer unit 40, as shown in FIG. 2, typically used for domestic storage of frozen foods. Such a unit is used because it is economical, reliable and capable of storing a pool of liquid 12 as shown in FIG. 1. The side walls, as well as the top and bottom of the freezer are insulated. The walls have an inner shell 44, an outer shell 46 and insulating material 48 therebetween. Typically the outer shell is of painted steel and the inner shell is of plastic or rust resistant metal. These are not modified from a standard freezer unit. The walls are cooled with freon filled tubes as is conventional. Thus the freezer unit 40 provides an enclosed reservoir for the apparatus. Top 20 can be opened in the conventional manner on hinges 46 to give access to the interior. When closed however the interior of the reservoir is substantially sealed apart from fan 22 discussed below.

Modifications to the freezer unit 40 are minimal and include an opening 50, formed in the back of this particular freezer unit, which receives the fan 52, best shown in FIG. 1. As may be seen, the fan is located above top surface 54 of the pool of aqueous solution 12 in the reservoir. The fan in this particular example is a computer cooling fan, although alternative fans could be substituted. The fan blows air into the freezer unit as indicated by arrows 60 in FIG. 1. There are also openings extending through the walls, between the freon filled tubes, for the conduits carrying the nutrient solution.

Figure 3:
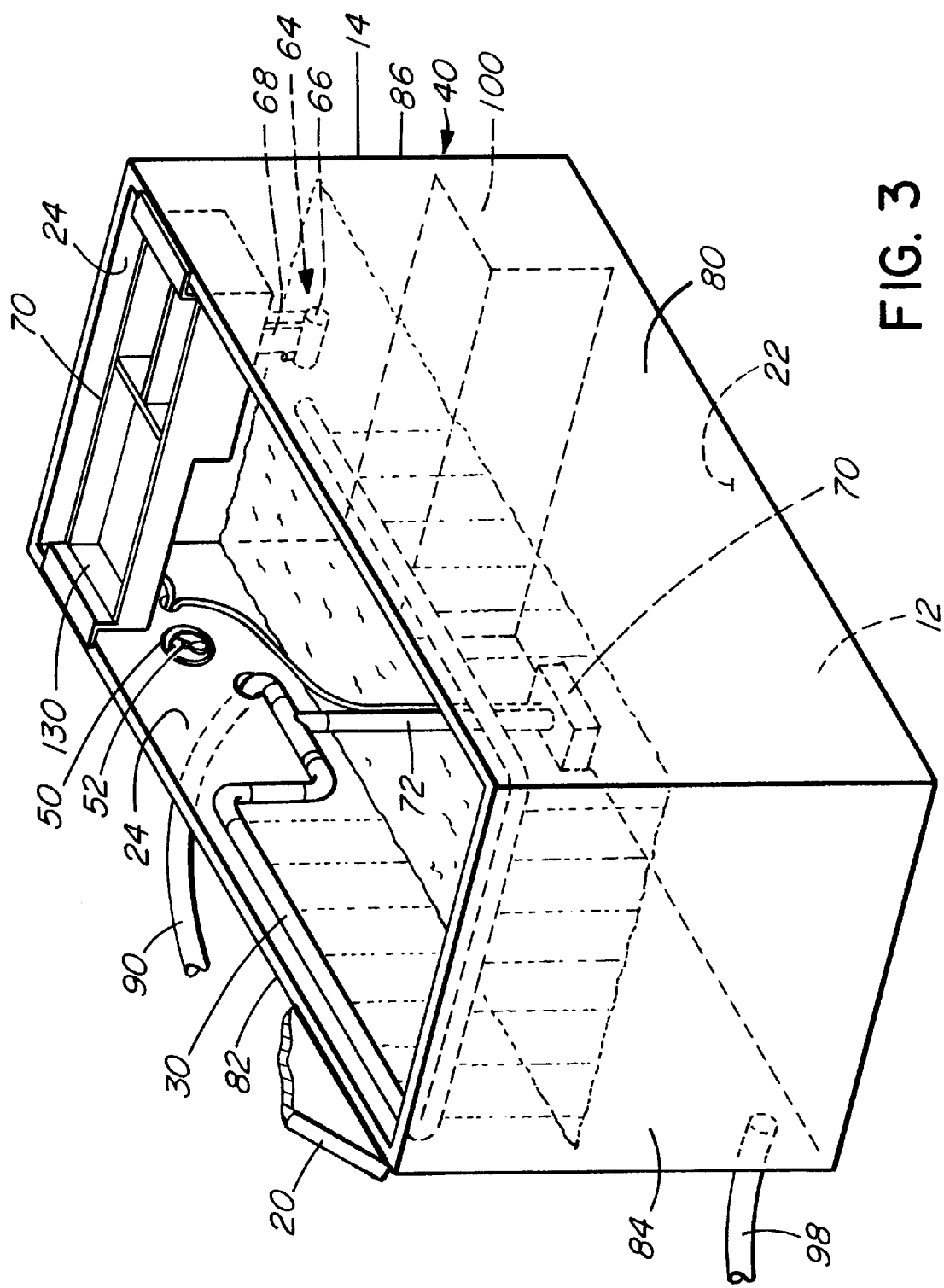
FIG. 3 is a diagrammatic, isometric view of the reservoir unit thereof.

The level of liquid in the reservoir is maintained by a float mechanism 64 shown in FIG. 3. This includes a float 66 mounted on an arm 68 which is operatively connected to a valve in tray 70. Alternatively the float mechanism may be similar to those used for toilet tanks to control the water level. The valve in this embodiment receives water from a domestic water and supply and opens or closes to maintain the level of liquid 12 in the reservoir.

There is a pump 70 connected to a riser pipe 72. The pipe in turn is connected to spray bar 30 which, in this embodiment, extends part way along front 80 and back 82 of the freezer unit 40 and along side 84. As discussed above, the spray bar is adjacent top 20 of the unit and sprays liquid on inside walls 24. It may be seen in FIG. 3 that the liquid drapes downwardly on the side walls to the pool of liquid 12. This cools the liquid since the walls are cooled by internal freon-filled tubes.

There is a conduit 90 which is connected to riser pipe 72 to supply liquid to roots 16 of the plant 18 and other such plants. Spray head 92 sprays the water onto the roots 16. There is a drip tray 94 which catches liquid dripping off of the roots and returns the liquid to the reservoir via conduit 98.

The freezer has a standard compressor and heat exchanger assembly 100 which cools the walls of the freezer unit. Power is supplied from a standard electrical outlet 102 to the compressor and the controls in tray 70 via electrical cables 104 and 106.

Figure 4:
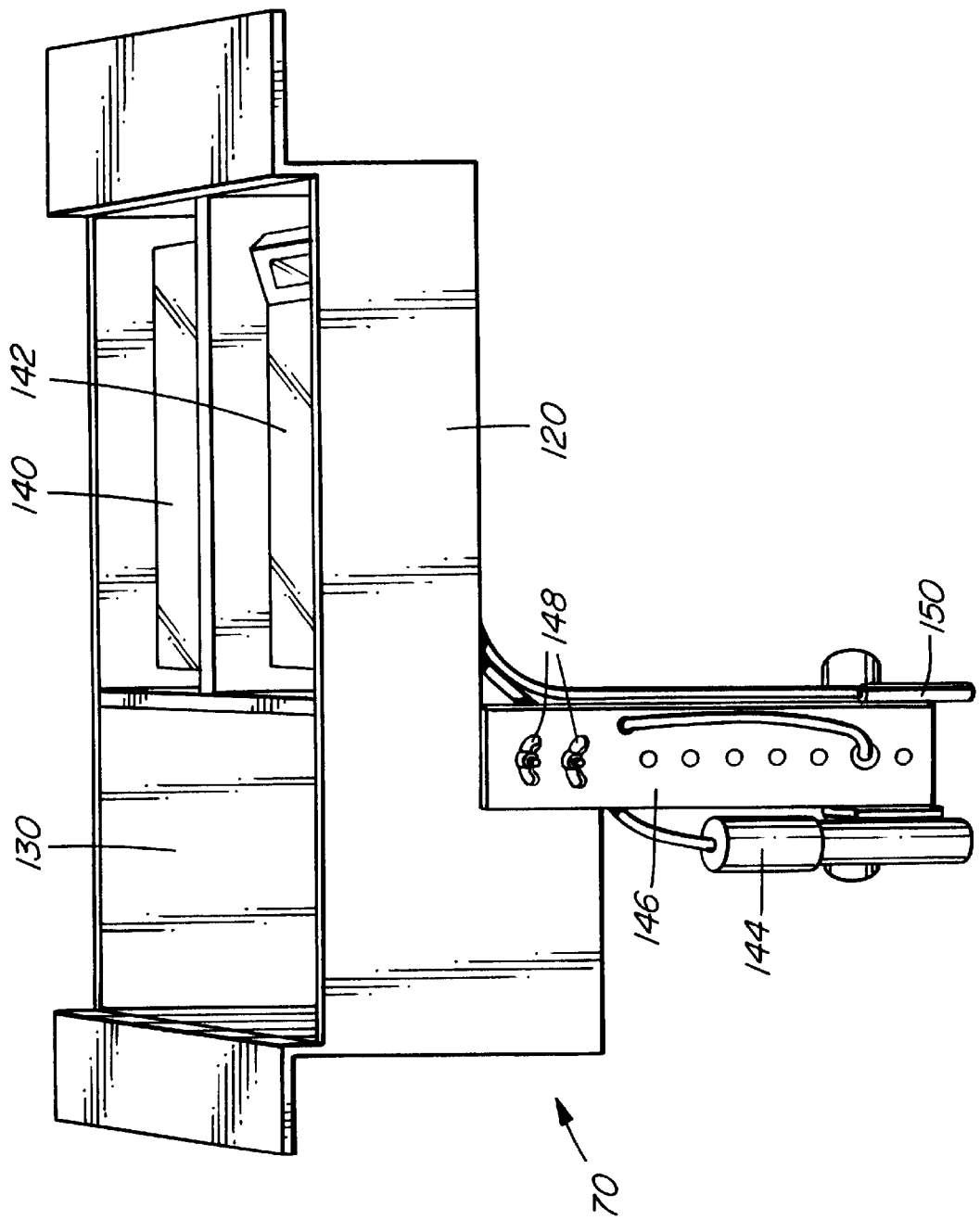
FIG. 4 is an isometric view of the combined tray and control unit thereof.

The tray 70 is shown in better detail in FIG. 4. The controls valve are mounted inside housing 120. There is also a cavity 130 for receiving various supplies such as fertilizers. The tray also houses temperature controller 140 and food meter 142. Probe 144 for the food meter is mounted on bar 146 connected to the tray by wing nuts 148 in this example. Temperature probe 150 is also mounted on the bar.

In operation, the reservoir 14, comprising freezer unit 40 in this embodiment, is partially filled with an aqueous solution containing fertilizers and other substances customarily used in hydroponic operations. Note however that the apparatus can be used or adapted for soil-based growing operations as well. Portions of the inside walls 24 are exposed below the spray bar 30, allowing the liquid to flow down the exposed walls as indicated at 32 in FIG. 1, cooling the liquid.

The depth of the pool of liquid 12 is regulated by the float mechanism 64. Water is admitted through conduit 130 when the level drops below a preset amount. The liquid is pumped upwardly by pump 70 to the spray bar 30. The pump also pumps the liquid through the riser 72 through conduit 90 to spray head 92. The liquid is sprayed onto the roots 16. Excess liquid drips into tray 94 and is pumped back to the reservoir through conduit 9.

The water in the reservoir is aerated by fan 52. This does away with the need for a separate aerator unit. Thus the invention provides a unified reservoir, aerator and cooling apparatus for the liquid applied to the roots of the plant.

It will be understood by someone skilled in the art that many of the details provided above are by way of example only and are not intended to limit the scope of the invention which is to be interpreted with reference to the following claims.

What is claimed is:

1. An apparatus for supplying an aqueous liquid for plants, comprising:
    an enclosed reservoir having inside walls and an opening in the walls of the reservoir;
    a fan located in the opening to direct air into the reservoir to aerate the liquid;
    conduit for discharging the liquid so the liquid flows along the walls of the reservoir; and
    a cooler for cooling the walls so the liquid flowing along the walls is thereby cooled.

2. An apparatus as claimed in claim 1, wherein the reservoir has a top, the conduit being near the top of the reservoir and the reservoir having a pool of liquid below the conduit, whereby the liquid flows over the walls and downwardly to the pool of liquid.

3. An apparatus as claimed in claim 2, wherein the walls are generally vertical.

4. An apparatus as claimed in claim 1, wherein the walls are insulated.

5. An apparatus as claimed in claim 1, wherein the apparatus includes a converted freezer unit.

6. An apparatus as claimed in claim 5, wherein the freezer unit is a chest-type freezer unit.

7. An apparatus as claimed in claim 1, wherein the conduit extends about at least a portion of the top of the reservoir.

8. An apparatus as claimed in claim 7, wherein the conduit has a plurality of spaced-apart apertures for discharging the liquid.

9. An apparatus for supplying an aqueous liquid for plants, comprising:
    a reservoir having a top and inside walls;
    a conduit near the top of the reservoir for discharging the liquid so the liquid flows along the walls of the reservoir, the reservoir having a pool of liquid below the conduit, whereby the liquid flows over the walls and downwardly to the pool of liquid;
    a cooler for cooling the walls so the liquid flowing along the walls is thereby cooled; and
    a pump operatively connected to the conduit for pumping liquid from the pool of liquid to the conduit.

10. An apparatus for supplying an aqueous liquid for plants, comprising:
    a reservoir having a top and inside walls;
    a conduit near the top of the reservoir for discharging the liquid so the liquid flows along the walls of the reservoir, the reservoir having a pool of liquid below the conduit, whereby the liquid flows over the walls and downwardly to the pool of liquid;

means for regulating the depth of the pool of liquid, the means for regulating including a float mechanism; and a cooler for cooling the walls so the liquid flowing along the walls is thereby cooled.

11. A method for treating an aqueous liquid for plants, comprising the steps of:

providing a reservoir for the liquid;

providing a pool of the aqueous liquid in the reservoir;

regulating the depth of the pool of liquid, the reservoir having walls extending above the pool of liquid, the liquid being directed along the walls and flowing downwardly into the pool; and cooling the reservoir and thereby cooling the aqueous liquid.

12. A method as claimed in claim 11, wherein the liquid is pumped from the pool to a position above the pool and then directed along the walls, the walls being cooled and thereby cooling the liquid.

13. A method as claimed in claim 11, wherein air is forced into the reservoir above the pool of liquid to aerate the liquid.

14. A method as claimed in claim 11, wherein the liquid is conducted from the reservoir to plants.

15. A method as claimed in claim 14, wherein the liquid is conducted from the plants back to the reservoir.

16. An apparatus for conditioning an aqueous liquid for plants, comprising:

a chest-type freezer unit having an interior, a top, a bottom, side walls and an opening in the side walls;

a fan mounted within the opening for directing air into the unit;

a spray bar extending about the interior of the freezer unit adjacent the side walls and adjacent the top thereof;

a conduit for supplying the aqueous liquid to the spray bar;

means for regulating a pool of liquid in the interior of the freezer unit, whereby the side walls extend above the pool of liquid so liquid discharged from the spray bar flows over the walls and downwardly to the pool;

a discharge conduit for conducting liquid from the freezer unit to plants; and an intake conduit for returning liquid from the plants to the freezer unit.

17. An apparatus as claimed in claim 16, wherein the means for regulating is a float mechanism.

18. An apparatus as claimed in claim 16, wherein the fan is above the pool of liquid.

* * * * *